(12) United States Patent
Higashide et al.

(10) Patent No.: US 11,982,535 B2
(45) Date of Patent: May 14, 2024

(54) OPERATION MANAGEMENT METHOD, SERVER, AND SYSTEM

(71) Applicant: TOYOTA JIDOSHA KABUSHIKI KAISHA, Toyota (JP)

(72) Inventors: Hiroshi Higashide, Nagoya (JP); Keiichi Uno, Chita-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 184 days.

(21) Appl. No.: 17/498,914

(22) Filed: Oct. 12, 2021

(65) Prior Publication Data
US 2022/0120570 A1 Apr. 21, 2022

(30) Foreign Application Priority Data

Oct. 21, 2020 (JP) .................................. 2020-176888

(51) Int. Cl.
| | | |
|---|---|---|
| G01C 21/34 | (2006.01) | |
| G05D 1/00 | (2006.01) | |
| G05D 1/02 | (2020.01) | |
| G08G 1/00 | (2006.01) | |
| G08G 1/127 | (2006.01) | |

(52) U.S. Cl.
CPC ....... *G01C 21/3407* (2013.01); *G05D 1/0291* (2013.01); *G08G 1/127* (2013.01); *G08G 1/22* (2013.01)

(58) Field of Classification Search
CPC ........ G05D 1/0291; G08G 1/127; G08G 1/22; G08G 1/133; G08G 1/202; G01C 21/3407
See application file for complete search history.

(56) References Cited

U.S. PATENT DOCUMENTS

| | | | |
|---|---|---|---|
| 6,728,630 B1 * | 4/2004 | Burt ................. | G08G 1/096838 |
| | | | 701/428 |
| 2020/0312149 A1 | 10/2020 | Umeda | |
| 2022/0187081 A1 * | 6/2022 | Fujita ................... | G01C 21/343 |

FOREIGN PATENT DOCUMENTS

| | | | | |
|---|---|---|---|---|
| JP | 2003-168193 A | | 6/2003 | |
| JP | 2006-163738 A | | 6/2006 | |
| JP | 2020013379 A | * | 7/2018 | ............. B60L 15/20 |

(Continued)

OTHER PUBLICATIONS

Machine Translation—JP2020013379A—Honda et al.—Jul. 19, 2018 (Year: 2018).*

*Primary Examiner* — Jess Whittington
*Assistant Examiner* — Rami Nabih Bedewi
(74) *Attorney, Agent, or Firm* — Oliff PLC (57) ABSTRACT

An operation management method for managing a plurality of circulating buses, each circulating bus being introduced into a circulation route from a base and returning to the base to be switched with another circulating bus after traveling a specified number of laps, includes storing, by a server, an operation schedule of the plurality of circulating buses, monitoring, by the server, a status of the plurality of circulating buses, and revising, by the server, the operation schedule when a first circulating bus traveling on the circulation route experiences failure before completing a specified number of laps, the operation schedule being revised so that a second circulating bus is introduced into the circulation route and returns to the base to be switched with a third circulating bus before completing the specified number of laps.

17 Claims, 6 Drawing Sheets

(56) References Cited

FOREIGN PATENT DOCUMENTS

| | | |
|---|---|---|
| JP | 2020-013379 A | 1/2020 |
| JP | 2020-160836 A | 10/2020 |

\* cited by examiner

OPERATION MANAGEMENT METHOD, SERVER, AND SYSTEM

CROSS-REFERENCE TO RELATED APPLICATION

This application claims priority to Japanese Patent Application No. 2020-176888, filed on Oct. 21, 2020, the entire contents of which are incorporated herein by reference.

TECHNICAL FIELD

The present disclosure relates to an operation management method, a server, and a system.

BACKGROUND

Technology for managing the operation of a plurality of vehicles is known. For example, patent literature (PTL) 1 discloses an autonomous vehicle that circulates along a travel route provided by a management center.

CITATION LIST

Patent Literature

PTL 1: JP 2020-013379 A

SUMMARY

When a vehicle is to travel a circulation route, the operation schedule can be determined so that the vehicle is systematically switched with another vehicle on standby so that, for example, operations such as refueling and maintenance can be performed on the vehicle. On the other hand, if a vehicle traveling on the circulation route experiences failure, for example, the vehicle could be switched with another vehicle on standby. However, since it is difficult to foresee the occurrence of failure, the switching of vehicles in response to the occurrence of failure may have an adverse effect on the pre-planned operation schedule. Therefore, there is room for improvement in technology for managing the operation of a plurality of vehicles.

It would be helpful to improve technology for managing operation of a plurality of vehicles.

An operation management method according to an embodiment of the present disclosure is an operation management method for managing a plurality of circulating buses, each circulating bus being introduced into a circulation route from a base and returning to the base to be switched with another circulating bus after traveling a specified number of laps, the operation management method including:
  storing, by a server, an operation schedule of the plurality of circulating buses;
  monitoring, by the server, a status of the plurality of circulating buses; and
  revising, by the server, the operation schedule when a first circulating bus traveling on the circulation route experiences failure before completing a specified number of laps, the operation schedule being revised so that a second circulating bus is introduced into the circulation route and returns to the base to be switched with a third circulating bus before completing the specified number of laps.

A server according to an embodiment of the present disclosure is a server for managing a plurality of circulating buses, each circulating bus being introduced into a circulation route from a base and returning to the base to be switched with another circulating bus after traveling a specified number of laps, the server including a controller configured to:
  store an operation schedule of the plurality of circulating buses;
  monitor a status of the plurality of circulating buses; and
  revise the operation schedule when a first circulating bus traveling on the circulation route experiences failure before completing a specified number of laps, the operation schedule being revised so that a second circulating bus is introduced into the circulation route and returns to the base to be switched with a third circulating bus before completing the specified number of laps.

A system according to an embodiment of the present disclosure is a system including a plurality of circulating buses, each circulating bus being introduced into a circulation route from a base and returning to the base to be switched with another circulating bus after traveling a specified number of laps, and a server for managing the plurality of circulating buses, wherein
  the server is configured to store an operation schedule of the plurality of circulating buses,
  the plurality of circulating buses operate in accordance with the operation schedule,
  the server is configured to
    monitor a status of the plurality of circulating buses, and
    revise the operation schedule when a first circulating bus traveling on the circulation route experiences failure before completing a specified number of laps, the operation schedule being revised so that a second circulating bus is introduced into the circulation route and returns to the base to be switched with a third circulating bus before completing the specified number of laps, and
  the second circulating bus and the third circulating bus operate in accordance with the revised operation schedule.

According to an embodiment of the present disclosure, technology for managing the operation of a plurality of vehicles is improved.

BRIEF DESCRIPTION OF THE DRAWINGS

In the accompanying drawings.

DETAILED DESCRIPTION

Hereinafter, an embodiment of the present disclosure will be described.

Summary of Embodiment

Figure 1:
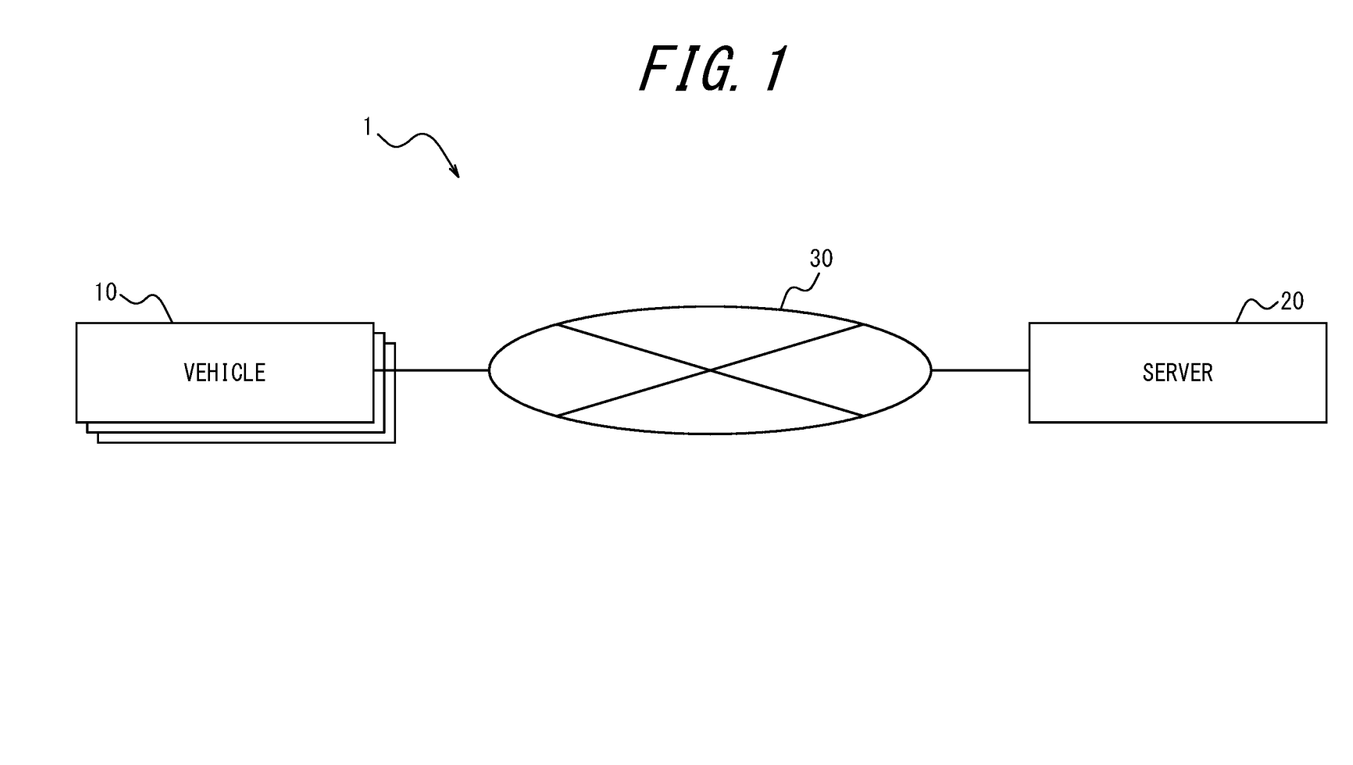
FIG. 1 is a block diagram illustrating a schematic configuration of a system according to an embodiment of the present disclosure.

An outline of a system 1 according to an embodiment of the present disclosure will be described with reference to FIG. 1. The system 1 includes a plurality of vehicles 10 and a server 20. The plurality of vehicles 10 and the server 20 can communicate with each other via a network 30 including, for example, the Internet and a mobile communication network. The vehicle 10 is, for example, a passenger automobile such as a bus, but the vehicle 10 is not limited to this and may be any vehicle that a person can board. The vehicle 10 may be capable of automated driving such as any one of Level 1 to Level 5 as defined by the Society of Automotive Engineers (SAE), for example. The server 20 is, for example, an information processing apparatus such as a computer.

In the present embodiment, the plurality of vehicles 10 are used as circulating buses that travel over a circulation route. The server 20 manages the operation of the plurality of vehicles 10 by notifying the plurality of vehicles 10 of an operation schedule. The plurality of vehicles 10 operate in accordance with the operation schedule notified by the server 20. If a vehicle 10 traveling on the circulation route experiences failure, the server 20 can revise the operation schedule as described below.

Figure 2:
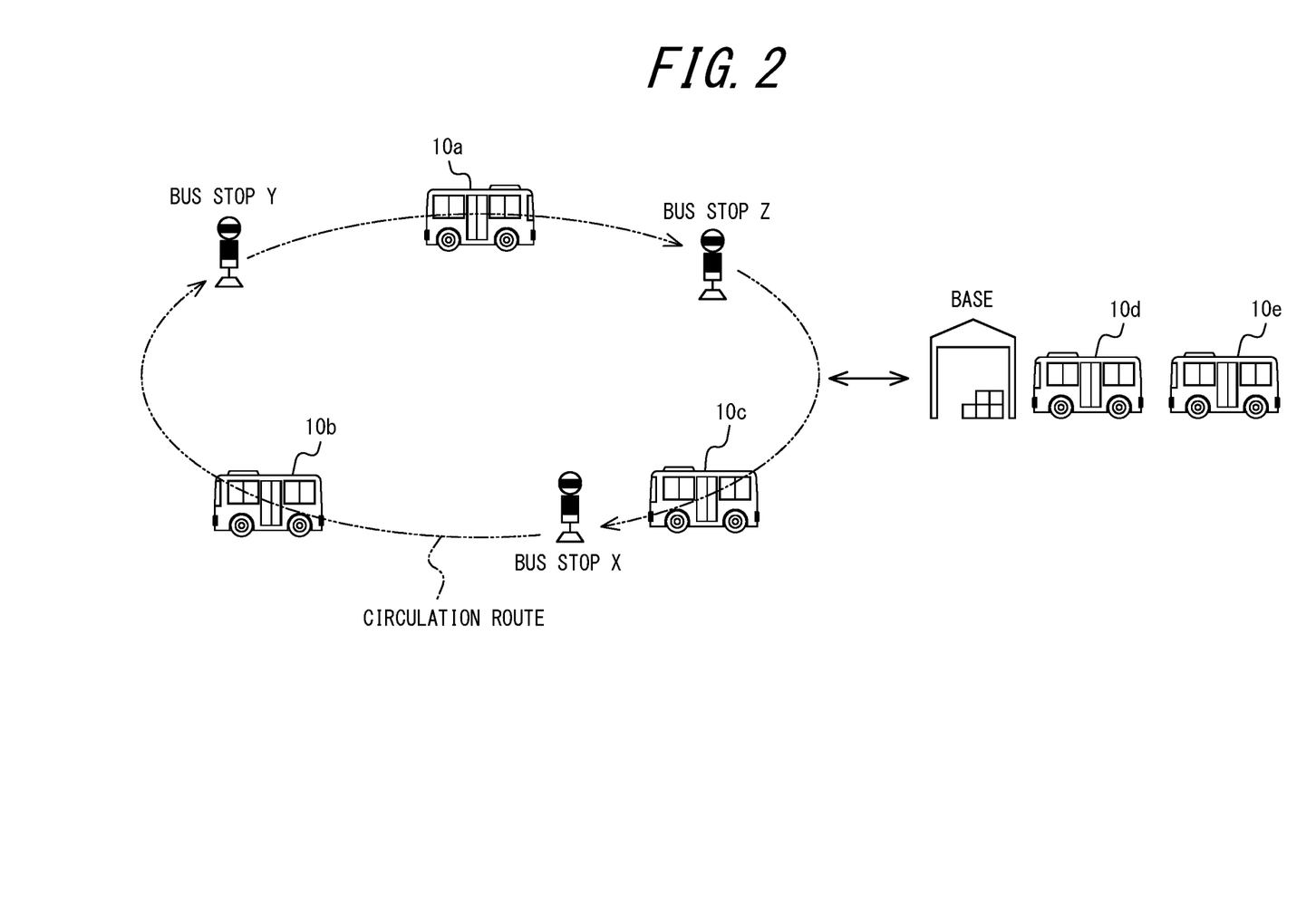
FIG. 2 is a diagram illustrating an overview of a transportation service according to an embodiment of the present disclosure.

With reference to FIG. 2, an overview of operations of each vehicle 10 that operates in accordance with the operation schedule before revision will be described. When introduced into the circulation route from a base, each vehicle 10 can travel clockwise along the circulation route while allowing passengers to get on and off at each bus stop among bus stops X to Z on the circulation route. In FIG. 2, three vehicles 10a to 10c are traveling on the circulation route. When each vehicle 10 has traveled a specified number of laps n (n=4 laps in the present embodiment) after being introduced into the circulation route, the vehicle 10 returns to the base and switches with another vehicle 10 on standby. Here, "switches" indicates that the vehicle 10 returns to the base from the circulation route and that the other vehicle 10 on standby is introduced into the circulation route from the base. The switching of a vehicle 10 with another vehicle 10 on standby is also referred to below as "normal switching". In FIG. 2, two vehicles 10d, 10e are on standby at the base. Each vehicle 10 returns to the base from the circulation route and remains on standby at the base after undergoing operations such as refueling and maintenance, for example.

The operation schedule before revision is determined so that the number of vehicles 10 traveling on the circulation route is, in principle, a specified number a (in the present embodiment, a=3). The operation schedule before revision is determined so that the above-described normal switching occurs once in each specified period P.

Figure 3:
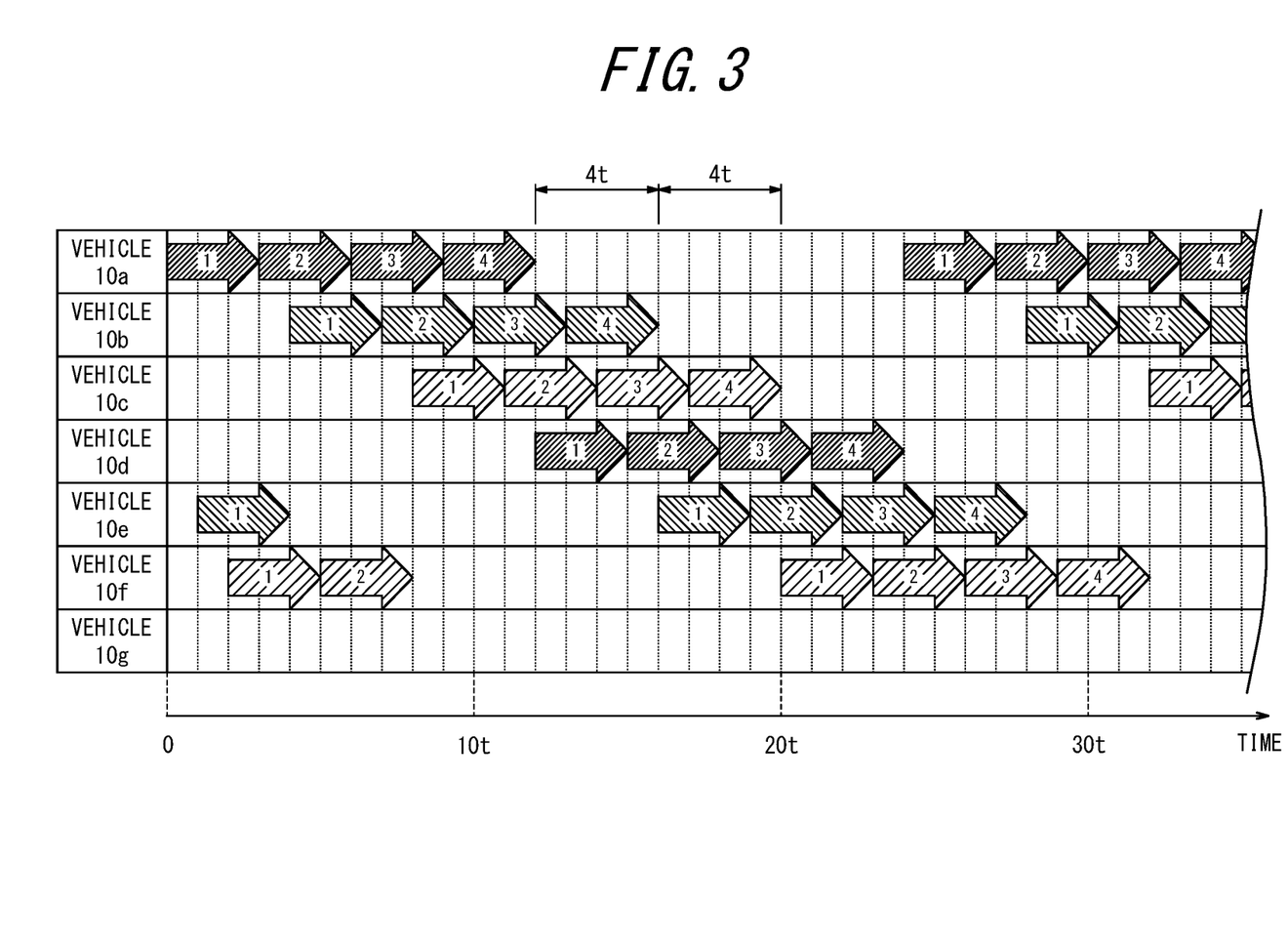
FIG. 3 is a diagram illustrating an example of the operation schedule before revision.

With reference to FIG. 3, the operation schedule before revision will be explained in detail. FIG. 3 illustrates the operation schedule assigned to each of seven vehicles 10a to 10g. The horizontal axis in FIG. 3 indicates the time. Time=0 is an operation start time of the transportation service using the plurality of vehicles 10. The time periods depicted with a rightward arrow indicate that the vehicle 10 is traveling on the circulation route. The length of the arrow indicates the time (3t in the present embodiment) required for the vehicle 10 to travel one lap on the circulation route. The numerical value inside the arrow indicates the number of the lap that the vehicle 10 is on after introduction into the circulation route. The time corresponding to the left end of the arrow with the number "1" inside indicates the time when the vehicle 10 is introduced into the circulation route from the base. The time corresponding to the right end of an arrow indicates the time at which the vehicle 10 returns to the base from the circulation route if there is no next arrow to the right of the arrow.

When the operation schedule before revision, illustrated in FIG. 3, is applied, the vehicle 10a is introduced into the circulation route from the base at time=0, and when the vehicle 10a completes the specified number of laps n (here, n=4 laps) at time=12t, the vehicle 10a returns to the base and is switched with the vehicle 10d on standby, for example. The vehicle 10d is introduced into the circulation route from the base at time=12t, returns to the base at time=24t after completing the specified number of laps n (here, n=4 laps), and is switched with the vehicle 10a on standby. In this way, the vehicles 10a and 10g operate while switching with each other. Similarly, the vehicles 10b and 10e operate while switching with each other, and the vehicles 10c and 10f operate while switching with each other. Here, so that a plurality of vehicles 10 are not on the same lap simultaneously, the vehicle 10b is introduced into the circulation route at time=4t, and the vehicle 10c is introduced into the circulation route at time=8t. Consequently, the number of vehicles 10 traveling on the circulation route is maintained at a specified number (in this case, three) from time=8t onwards. The above-described normal switching also occurs once in a specified period P (here, P=4t) from time=12t onwards. Furthermore, since a plurality of vehicles 10 are not on the same lap simultaneously, the specified period P can be longer than the time required for the vehicle 10 to make one lap of the circulation route (in this case, 3t). By lengthening the specified period P in which the normal switching occurs, the frequency with which the vehicles 10 return to the base from the circulation route is reduced, thereby increasing the time available for operations such as refueling and maintenance to be performed on the vehicles 10 that return to the base.

As an exception, the vehicle 10e is introduced into the circulation route at time=t and is switched with the vehicle 10b at time=4t. As an exception, the vehicle 10f is introduced into the circulation route at time=2t and is switched with the vehicle 10c at time=8t. Consequently, the number of vehicles 10 traveling on the circulation route is maintained at the specified number (in this case, three) from time=2t onwards. The above-described normal switching occurs once in each specified period P (here, P=4t) from time=4t onwards. Note that during a certain time period (here, the period from time=0 to time=8t) from the operation start time of the transportation service, a plurality of vehicles 10 are on the same lap simultaneously on an exceptional basis. However, in order for the cycle in which the normal switching occurs to be maintained as the specified period P (here, P=4t), the vehicles 10e and 10f that are exceptionally introduced during the certain time period are switched with the vehicles 10b and 10c, respectively, before completing the specified number of laps n (here, n=4 laps).

Figure 4:
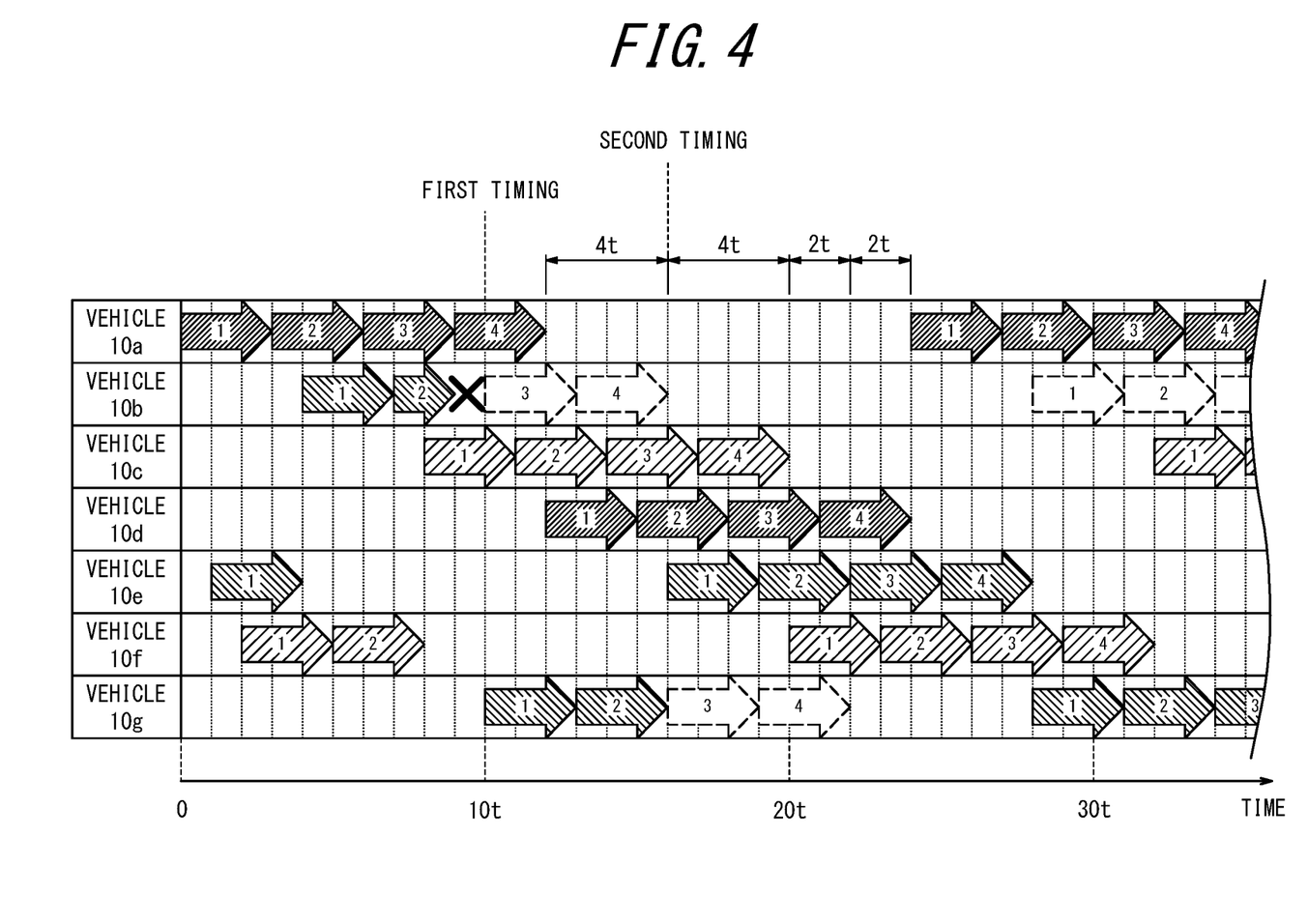
FIG. 4 is a diagram illustrating an example of a revised operation schedule.

With reference to FIG. 4, the revised operation schedule will be explained in detail. FIG. 4 illustrates an operation schedule revised by the server 20 in the case in which the vehicle 10b traveling on the circulation route experiences failure before completing the specified number of laps n (here, n=4 laps). The differences from the operation schedule before revision illustrated in FIG. 3 are described below. The "x" mark in FIG. 3 indicates that the vehicle 10b, which is traveling on the $m^{th}$ lap of the circulation route (here, m=2), has experienced failure at time=9t, making it impossible to continue traveling from time=9t onwards. The dashed arrows to the right corresponding to the vehicle 10b in FIG. 3 indicate cancellation of the travel, scheduled in the operation schedule before revision, from time=10t onwards by the vehicle 10a.

In the present embodiment, if the vehicle 10b experiences failure on the $m^{th}$ lap (where m is a equal to or greater than 1 and less than n), the vehicle 10g is introduced into the circulation route from the base as a substitute for the vehicle 10b. The number of vehicles 10 traveling on the circulation route is thereby maintained at a specified number (in this case, three). In greater detail, the vehicle 10g is introduced into the circulation route at a first timing (here, time=10t) at which the vehicle 10b was scheduled to start the $(m+1)^{th}$ lap (here, m+1=3) in the operation schedule before revision. Accordingly, the number of vehicles 10 traveling on the circulation route is maintained at a specified number (in this case, three), except for the time period from time=9t, when the failure of the vehicle 10b occurs, to time=10t, when the vehicle 10g is introduced into the circulation route. When a vehicle 10 traveling on the circulation route experiences failure before completing the specified number of laps n (here, n=4 laps), the introduction of another vehicle 10 is also referred to below as "failure switching".

The vehicle 10g then returns to the base before completing the specified number of laps n (here, n=4 laps) and is switched with the vehicle 10e, which was scheduled to switch with the vehicle 10b in the operation schedule before revision. In greater detail, the vehicle 10g completes its second lap and is switched with the vehicle 10e at a second timing (here, time=16t) at which the vehicle 10b was scheduled to complete the specified number of laps n (here, n=4 laps) in the operation schedule before revision. According to this configuration, even when a failure switching occurs, the cycle in which normal switching occurs is maintained at the specified period P (here, P=4t). Also, according to such a configuration, the timing at which normal switching occurs for the vehicle 10e need not be revised, thereby reducing the load on the server 20 for revising the operation schedule in contrast with the comparative example described below.

As a comparative example, revision of the operation schedule so that the vehicle 10g, which was introduced by failure switching, finishes traveling the specified number of laps n (here, n=4 laps) at time=22t and is switched with the vehicle 10e is now considered. In such a case, the normal switching of the vehicles 10g and 10e occurs at time=22t, but the normal switching of the vehicles 10c and 10f occurs at time=20t, and the normal switching of the vehicles 10d and 10a occurs at time=24t. The cycle over which normal switching occurs therefore becomes 2t during the time period from time=20t to time=24t. The cycle over which normal switching occurs therefore cannot be maintained at the specified period P (here, P=4t). In such a case, it is necessary to delay the timing at which the vehicle 10e is introduced into the circulation route by normal switching from time=16t to time=22t. It thus becomes necessary to revise the timing at which normal switching occurs for the vehicle 10e to span the time period after failure of the vehicle 10b. Hence, according to the above-described configuration in the present embodiment, the load on the server 20 for revising the operation schedule is reduced in comparison with the comparative example.

A portion of the operation schedule assigned to the vehicle 10b that experienced failure is newly assigned to the vehicle 10g, the portion starting at the timing at which the vehicle 10g introduced into the circulation route by failure switching returns to the base (here, time=16t, which corresponds to the second timing). Specifically, the operation schedule of the vehicle 10b before revision is planned so that, for example, operations such as refueling and maintenance are performed on vehicle 10b between time=16t and time=28t, and the vehicle 10b switches with the vehicle 10e at time=28t. As a result of the new assignment of the operation schedule of the vehicle 10b to the vehicle 10g, the revised operation schedule of the vehicle 10g is planned so that, for example, operations such as refueling and maintenance are performed on the vehicle 10g between time=16t and time=28t, and the vehicle 10g switches with the vehicle 10e at time=28t. The target for new assignment of the operation schedule of the vehicle 10b may also be a vehicle 10 other than the vehicles 10a to 10g.

Next, configurations of the system 1 will be described in detail.

(Configuration of Vehicle)

Figure 5:
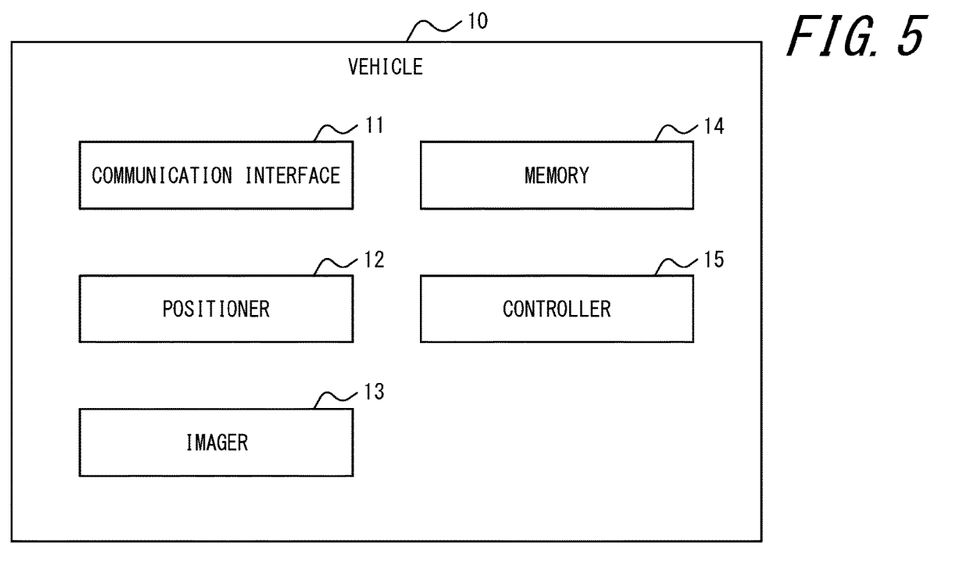
FIG. 5 is a block diagram illustrating a schematic configuration of a vehicle.

As illustrated in FIG. 5, the vehicle 10 includes a communication interface 11, a positioner 12, an imager 13, a memory 14, and a controller 15.

The communication interface 11 includes at least one communication interface for connecting to the network 30. The communication interface is compliant with mobile communication standards such as the $4^{th}$ generation (4G) standard or the $5^{th}$ generation (5G) standard, but these examples are not limiting. In the present embodiment, the vehicle 10 is communicably connected with the server 20 via the communication interface 11 and the network 30.

The positioner 12 includes one or more apparatuses configured to acquire positional information for the vehicle 10. Specifically, the positioner 12 includes, for example, a receiver compliant with GPS, but is not limited to this example and may include a receiver compliant with any appropriate satellite positioning system.

The imager 13 includes one or more cameras. Each camera included in the imager 13 may be installed in the vehicle 10 so as to be able to capture a subject outside or inside the vehicle, for example. The images generated by the imager 13 can, for example, be used for autonomous driving control of the vehicle 10.

The memory 14 includes one or more memories. The memories are semiconductor memories, magnetic memories, optical memories, or the like, for example, but are not limited to these. The memories included in the memory 14 may each function as, for example, a main memory, an auxiliary memory, or a cache memory. The memory 14 stores any information used for operations of the vehicle 10. For example, the memory 14 may store a system program, an application program, embedded software, and the like. The information stored in the memory 14 may be updated with, for example, information acquired from the network 30 via the communication interface 11.

The controller 15 includes at least one processor, at least one programmable circuit, at least one dedicated circuit, or a combination of these. The processor is a general purpose processor such as a central processing unit (CPU) or a graphics processing unit (GPU), or a dedicated processor that is dedicated to specific processing, for example, but is not limited to these. The programmable circuit is a field-programmable gate array (FPGA), for example, but is not limited to this. The dedicated circuit is an application specific integrated circuit (ASIC), for example, but is not limited to this. The controller 15 controls the operations of the entire vehicle 10. For example, the controller 15 controls the operations of the vehicle 10 according to the operation schedule notified by the server 20.

(Configuration of Server)

Figure 6:
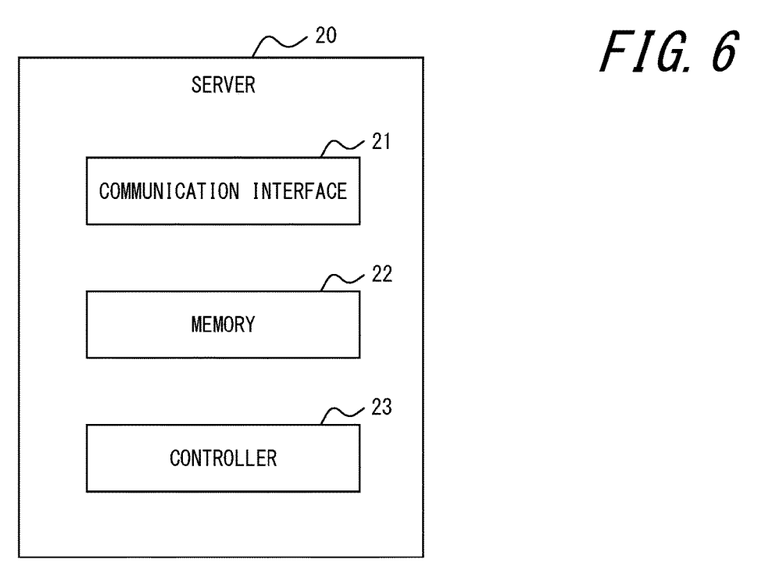
FIG. 6 is a block diagram illustrating a schematic configuration of a server.

As illustrated in FIG. 6, the server 20 includes a communication interface 21, a memory 22, and a controller 23.

The communication interface 21 includes at least one communication interface for connecting to a network. The communication interface may be compliant with, for example, mobile communication standards, wired local area network (LAN) standards, or wireless LAN standards, but these examples are not limiting. The communication interface may be compliant with any appropriate communication standards. In the present embodiment, the server 20 communicates with the vehicle 10 via the communication interface 21.

The memory 22 includes one or more memories. The memories included in the memory 22 may each function as, for example, a main memory, an auxiliary memory, or a cache memory. The memory 22 stores any information used for operations of the server 20. For example, the memory 22 may store a system program, an application program, a database, map information, the operation schedule of the plurality of vehicles 10, and the like. The information stored in the memory 22 may be updated with, for example, information acquired from the network 30 via the communication interface 21.

The controller 23 includes at least one processor, at least one programmable circuit, at least one dedicated circuit, or a combination of these. The controller 23 controls the operations of the entire server 20. Details of the operations of the server 20 controlled by the controller 23 will be described later.

(Server Operation Flow)

Figure 7:
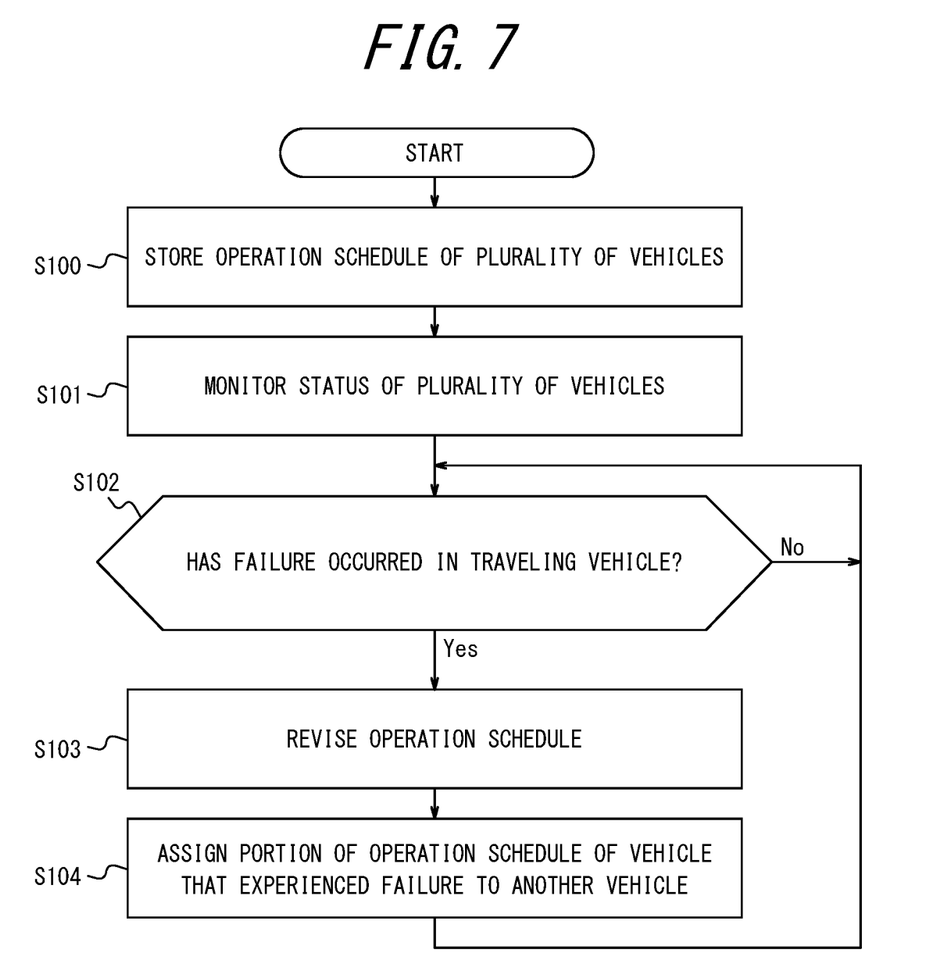
FIG. 7 is a flowchart illustrating operations of the server.

With reference to FIG. 7, operations of the server 20 according to the present embodiment will be described.

Step S100: The controller 23 of the server 20 stores the operation schedule of the plurality of vehicles 10 in the memory 22. The operation schedule may, for example, be generated automatically by the controller 23, inputted by an operator, or acquired from an external apparatus via the communication interface 21 and the network 30.

Details are now provided in accordance with the example illustrated in FIG. 3. The operation schedule stored in step S100 is determined so that a plurality of vehicles 10 are not on the same lap simultaneously, except for a certain time period (here, the time period from time=0 to time=8t) from the operation start time of the transportation service that uses the plurality of vehicles 10. Furthermore, the operation schedule is determined so that the switching between a vehicle 10 that has completed the specified number of laps n (here, n=4 laps) and another vehicle 10 occurs once in a specified period P (here, P=4t).

Step S101: The controller 23 starts monitoring the status of the plurality of vehicles 10. Specifically, the controller 23 is communicably connected to each vehicle 10 via the communication interface 21 and the network 30. The controller 23 notifies the plurality of vehicles 10 of the operation schedule of step S100. Each vehicle 10 operates in accordance with the operation schedule notified by the server 20. The controller 23 then monitors the status of each vehicle 10 by receiving vehicle information from each vehicle 10 periodically or at any appropriate timing, for example. The vehicle information includes information indicating whether a failure has occurred in the vehicle 10, but this example is not limiting. The vehicle information may include any appropriate information about the vehicle 10, such as positional information for the vehicle 10, the vehicle speed, and information indicating deviation from the operation schedule.

Step S102: The controller 23 judges whether the vehicle 10 traveling on the circulation route has experienced failure before completing the specified number of laps n. When it is judged that the vehicle 10 has experienced failure (step S102: Yes), the process advances to step S103. Conversely, when it is judged that the vehicle 10 has not experienced failure (step S102: No), the process repeats step S102.

Step S103: When it is judged in step S102 that the vehicle 10 has experienced failure (step S102: Yes), the controller 23 revises the operation schedule stored in step S100.

Details are now provided in accordance with the example illustrated in FIG. 4. When the vehicle 10b traveling on the circulation route experiences failure before completing the specified number of laps n (here, n=4 laps), the controller 23 revises the operation schedule so that the vehicle 10g is introduced into the circulation route, and so that the vehicle 10g returns to the base to be switched with the vehicle 10e before completing the specified number of laps n (here, n=4 laps). Here, by revising the operation schedule so that vehicle 10g is introduced into the circulation route when the vehicle 10b experiences failure before completing the specified number of laps n (here, n=4 laps), the controller 23 maintains the number of vehicle 10 traveling on the circulation route at the specified number a (here, a=3).

In greater detail, if the vehicle 10b experiences failure on the $m^{th}$ lap (m is a natural number equal to or greater than 1 and less than n; here, m=2), the operation schedule is revised so that vehicle 10g is introduced into the circulation route at the first timing (here, time=10t) at which the vehicle 10b was scheduled to start the $(m+1)^{th}$ lap. The operation schedule is revised so that the vehicle 10g is switched with the vehicle 10e at the second timing (here, time=16t) when the vehicle 10b was scheduled to complete the specified number of laps n (here, n=4 laps).

Step S104: The controller 23 newly assigns a portion of the operation schedule that was assigned to the vehicle 10 that experienced failure to another vehicle 10. The controller 23 notifies the plurality of vehicles 10 of the operation schedule after the revision in steps S103 and S104. The process subsequently advances to step S102.

Details are now provided in accordance with the example in FIG. 4. The controller 23 newly assigns a portion of the operation schedule assigned to the vehicle 10b that experienced failure to the vehicle 10g, the portion starting at the timing at which the vehicle 10g returns to the base (here, time=16t, which corresponds to the second timing). As described above, however, the target for assignment of the operation schedule may also be a vehicle 10 other than the vehicles 10a to 10g.

While the present disclosure has been described with reference to the drawings and examples, it should be noted that various revisions and revisions may be implemented by those skilled in the art based on the present disclosure. Accordingly, such revisions and revisions are included within the scope of the present disclosure. For example, functions or the like included in each component, each step, or the like can be rearranged without logical inconsistency, and a plurality of components, steps, or the like can be combined into one or divided.

For example, an embodiment in which the configuration and operations of the server 20 in the above embodiment are distributed to a plurality of information processing apparatuses capable of communicating with each other can also be implemented. For example, an embodiment in which some or all of the components of the server 20 are provided in the vehicle 10 can also be implemented.

In the above embodiment, when a plurality of vehicles 10 on a circulation route experiences failure in a relatively short period of time, for example, other vehicles 10 that serve as substitutes for the plurality of vehicles 10 do not necessarily have to be introduced into the circulation route. For example, an upper limit may be set on the number of substitute vehicles 10 that can be introduced into the circulation route during a certain time period going back from the current time (such as the time period from the current time to 3t ago in the case in which the time required for the vehicle 10 to travel one lap of the circulation route is 3t). If a plurality of vehicles 10 on the circulation route experienced failure in a relatively short period of time and failure switching were implemented for each of the vehicles 10, the number of vehicles 10 on standby at the base might become less than planned or reach zero. In such a case, inconveniences such as an inability to implement the scheduled normal switching may occur. The above-described configuration for setting an upper limit on the number of substitute vehicles 10 that can be introduced into the circulation route, however, reduces the probability of such inconveniences occurring.

In the above embodiment, the time distance between a vehicle 10 traveling on the circulation route and another vehicle 10 traveling on the circulation route may become shorter than scheduled if deviation from the operation schedule (such as delay time) increases. For example, in the operation schedule illustrated in FIG. 3, the time distance between the vehicles 10 traveling on the circulation route is scheduled to be t. If a vehicle 10 is delayed relative to the operation schedule, however, the time distance may be reduced by the amount of the delay. Here, when a substitute vehicle 10 is introduced into the circulation route by normal switching or failure switching, the controller 23 may, for example, judge whether any of the vehicles 10 traveling on the circulation route has a time distance from the base of less than a reference value (such as t). The controller 23 may then withhold introduction of the substitute vehicle 10 until there is no longer a vehicle 10 with a time distance from the base of less than the reference value.

For example, an embodiment in which a general purpose computer functions as the server 20 according to the above embodiment can also be implemented. Specifically, a program in which processes for realizing the functions of the server 20 according to the above embodiment are written may be stored in a memory of a general purpose computer, and the program may be read and executed by a processor. Accordingly, the present disclosure can also be implemented as a program executable by a processor, or a non-transitory computer readable medium storing the program.

The invention claimed is:

1. An operation management method for managing a plurality of circulating buses, each circulating bus being introduced into a circulation route from a base and returning to the base to be switched with another circulating bus after traveling a specified number of laps, the operation management method comprising:
   storing, by a server, an operation schedule of the plurality of circulating buses;
   monitoring, by the server, a status of the plurality of circulating buses;
   generating, by the server, a revised operation schedule, wherein generating the revised operation schedule comprises: revising, by the server, the operation schedule when a first circulating bus traveling on the circulation route experiences failure before completing a specified number of laps, the operation schedule being further revised so that a second circulating bus is introduced into the circulation route, returns to the base before completing the specified number of laps and is switched with a third circulating bus at a second timing at which the first circulating bus was scheduled to complete the specified number of laps;
   notifying, by the server, the plurality of circulating buses of the revised operation schedule;
   and controlling, by a controller of each of the plurality of circulating buses, wherein operations of the plurality of circulating buses is in accordance with the revised operation schedule.

2. The operation management method of claim 1, comprising maintaining, by the server, the number of circulating buses traveling on the circulation route by revising the operation schedule so that the second circulating bus is introduced into the circulation route when the first circulating bus experiences failure before completing the specified number of laps.

3. The operation management method of claim 1, wherein the specified number of laps is n laps, and m is a natural number equal to or greater than 1 and less than n, and when the first circulating bus experiences failure on an $m^{th}$ lap, the operation schedule is revised so that the second circulating bus is introduced into the circulation route at a first timing at which the first circulating bus was scheduled to start an $(m+1)^{th}$ lap.

4. The operation management method of claim 1, wherein the operation schedule before revision is determined so that a plurality of circulating buses is not on the same lap simultaneously, except for a certain time period from an operation start time of a transportation service that uses the plurality of circulating buses.

5. The operation management method of claim 1, wherein the operation schedule before revision is determined so that switching between a circulating bus that has completed the specified number of laps and another circulating bus occurs once in a specified period.

6. The operation management method of claim 1, further comprising newly assigning, by the server, a portion of the operation schedule assigned to the first circulating bus to the second circulating bus, the portion starting at a timing at which the second circulating bus returns to the base.

7. A server for managing a plurality of circulating buses, each circulating bus being introduced into a circulation route from a base and returning to the base to be switched with another circulating bus after traveling a specified number of laps, the server comprising a controller configured to:
   store an operation schedule of the plurality of circulating buses;
   monitor a status of the plurality of circulating buses;
   generate a revised operation schedule, wherein generating the revised operation schedule comprises: revising the operation schedule when a first circulating bus traveling on the circulation route experiences failure before completing a specified number of laps, the operation schedule being further revised so that a second circulating bus is introduced into the circulation route, returns to the base before completing the specified number of laps and is switched with a third circulating bus at a second timing at which the first circulating bus was scheduled to complete the specified number of laps;
   and notify the plurality of circulating buses of the revised operation schedule to control operations of the plurality of circulating buses in accordance with the revised operation schedule.

8. The server of claim 7, wherein the controller is configured to maintain the number of circulating buses traveling on the circulation route by revising the operation schedule so that the second circulating bus is introduced into the circulation route when the first circulating bus experiences failure before completing the specified number of laps.

9. The server of claim 7, wherein
the specified number of laps is n laps, and m is a natural number equal to or greater than 1 and less than n, and
the controller is configured to revise the operation schedule when the first circulating bus experiences failure on an $m^{th}$ lap, so that the second circulating bus is introduced into the circulation route at a first timing at which the first circulating bus was scheduled to start an $(m+1)^{th}$ lap.

10. The server of claim 7, wherein the operation schedule before revision is determined so that a plurality of circulating buses is not on the same lap simultaneously, except for a certain time period from an operation start time of a transportation service that uses the plurality of circulating buses.

11. The server of claim 7, wherein the operation schedule before revision is determined so that switching between a circulating bus that has completed the specified number of laps and another circulating bus occurs once in a specified period.

12. The server of claim 7, wherein the controller is configured to newly assign a portion of the operation schedule assigned to the first circulating bus to the second circulating bus, the portion starting at a timing at which the second circulating bus returns to the base.

13. A system comprising a plurality of circulating buses, each circulating bus being introduced into a circulation route from a base and returning to the base to be switched with another circulating bus after traveling a specified number of laps, and a server for managing the plurality of circulating buses, wherein the server is configured to store an operation schedule of the plurality of circulating buses, the plurality of circulating buses operate in accordance with the operation schedule,
the server is configured to monitor a status of the plurality of circulating buses, generate a revised operation schedule, wherein generating the revised operation schedule comprises: revising the operation schedule when a first circulating bus traveling on the circulation route experiences failure before completing a specified number of laps, the operation schedule being further revised so that a second circulating bus is introduced into the circulation route, returns to the base before completing the specified number of laps and is switched with a third circulating bus at a second timing at which the first circulating bus was scheduled to complete the specified number of laps, and notify the plurality of circulating buses of the revised operation schedule, and the plurality of circulating buses operate in accordance with the revised operation schedule.

14. The system of claim 13, wherein
the specified number of laps is n laps, and m is a natural number equal to or greater than 1 and less than n, and
the server is configured to revise the operation schedule when the first circulating bus experiences failure on an $m^{th}$ lap, so that the second circulating bus is introduced into the circulation route at a first timing at which the first circulating bus was scheduled to start an $(m+1)^{th}$ lap.

15. The system of claim 13, wherein the operation schedule before revision is determined so that a plurality of circulating buses is not on the same lap simultaneously, except for a certain time period from an operation start time of a transportation service that uses the plurality of circulating buses.

16. The system of claim 13, wherein the operation schedule before revision is determined so that switching between a circulating bus that has completed the specified number of laps and another circulating bus occurs once in a specified period.

17. The system of claim 13, wherein the server is configured to newly assign a portion of the operation schedule assigned to the first circulating bus to the second circulating bus, the portion starting at a timing at which the second circulating bus returns to the base, and the second circulating bus operates in accordance with the newly assigned operation schedule starting at the timing at which the second circulating bus returns to the base.

\* \* \* \* \*